United States Patent [19]
Silverbrook et al.

[11] Patent Number: 6,158,907
[45] Date of Patent: Dec. 12, 2000

[54] PC CARD PRINTER

[75] Inventors: Kia Silverbrook, Balmain; Tobin Allen King, Cremorne, both of Australia

[73] Assignee: Silverbrook Research Pty. Ltd., Australia

[21] Appl. No.: 09/436,509

[22] Filed: Nov. 9, 1999

[30] Foreign Application Priority Data

Nov. 9, 1998 [AU] Australia .................................. PP7019

[51] Int. Cl.⁷ ....................................................... B41J 3/36
[52] U.S. Cl. ................................................................ 400/88
[58] Field of Search ................................................ 400/88

[56] References Cited

U.S. PATENT DOCUMENTS 5,559,932 9/1996 Machida et al. ......................... 395/114
6,007,195 12/1999 Kokubo .................................... 347/108

Primary Examiner—John S. Hilten
Assistant Examiner—Charles H. Nolan, Jr.

[57] ABSTRACT

A portable printer for printing out small, typically business card size, sheets using a pagewidth inkjet printhead. At one end of the printer there is provided a PCMCIA plug for interconnection with a PC card slot. In one form of the invention, the entire printer and paper supply cartridge are approximately the size of a PCMCIA type III card.

10 Claims, 4 Drawing Sheets

PC CARD PRINTER

FIELD OF THE INVENTION

The present invention relates to compact portable printers and in particular discloses a printer directly engageable with a PCMCIA slot.

BACKGROUND OF THE INVENTION

Portable printers and in particular portable inkjet printers have been designed that are sufficiently compact in size to be readily carried e.g. in a brief case and used in conjunction with computer type devices such as lap top or notebook computers for printing documents when required.

The present invention seeks to further enhance the portability and usefulness of portable inkjet printers by providing an extremely compact printer which is directly engageable with a signal generating device, such as a computer, having a PC card or PCMCIA slot.

SUMMARY OF THE INVENTION

The present invention therefore provides a printer including a printing means, a print media transport means, an ink storage means, a fluidic connection between said ink storage means and said printing means, and a data connection means for transferring print data to said printing means, wherein said data connection means is a PC card (PCMCIA) interface.

Preferably the print media transport means is associated with a docking bay adapted to receive a paper cartridge and arranged to transport paper from the cartridge past the printing means.

Preferably the printer is contained within a support case, and wherein the PC card interface protrudes from one end of the case.

Preferably the printing means comprises an inkjet printhead.

Preferably the printhead is a pagewidth inkjet printhead.

In one form of the invention the sheet paper cartridge is adapted to hold business card size sheets of paper and the assembled cartridge and printer are approximately the size of a PCMCIA type III card.

Preferably the printhead includes an array of ink ejection nozzles, each nozzle communicating with a chamber incorporating a paddle moved by a thermal bend actuator adapted to be activated for the ejection of ink on demand from the nozzle.

BRIEF DESCRIPTION OF THE DRAWINGS

Notwithstanding any other forms that may fall within its scope, one preferred form of the invention will now be described, by way of example only, with reference to the accompanying drawings, in which.

DESCRIPTION OF PREFERRED AND OTHER EMBODIMENTS

In the preferred form of the invention, a small compact printer is provided which is adapted to print on business card sized sheets of paper and which is sized to fit within the constraints of a PCMCIA type III card (the PCMCIA—Personal Computer Memory Card International Association—sets parameters for so called PC cards with a type III card having a typical size of 85.6 mm by 54 mm and a thickness of 10.5 mm). It will, however, be appreciated that a printer made according to the invention can be of a larger size e.g. to print on 6 inch by 4 inch photo sized paper while still incorporating a direct interface with a PCMCIA slot by way of a PCMCIA interface plug as will be described below.

In the preferred form of the invention the printer comprises a support case 1 having a PCMCIA interface plug 2 protruding from one end and a pagewidth inkjet printer extending substantially across the case beneath a cover 3 at the opposite end.

Figure 1:
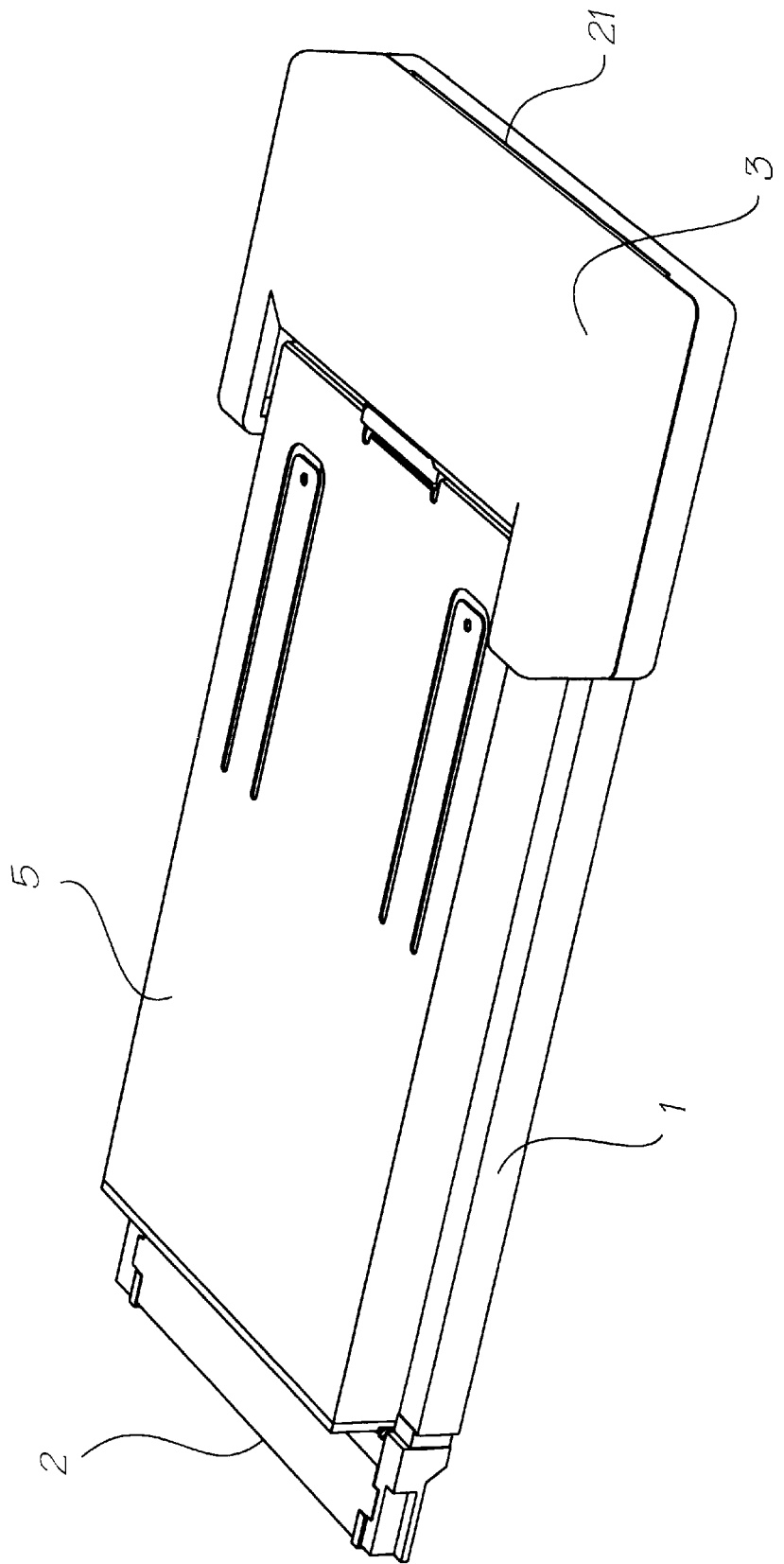
FIG. 1 is a perspective view of a portable printer according to the invention showing a sheet paper cartridge engaged with the printer.
Figure 2:
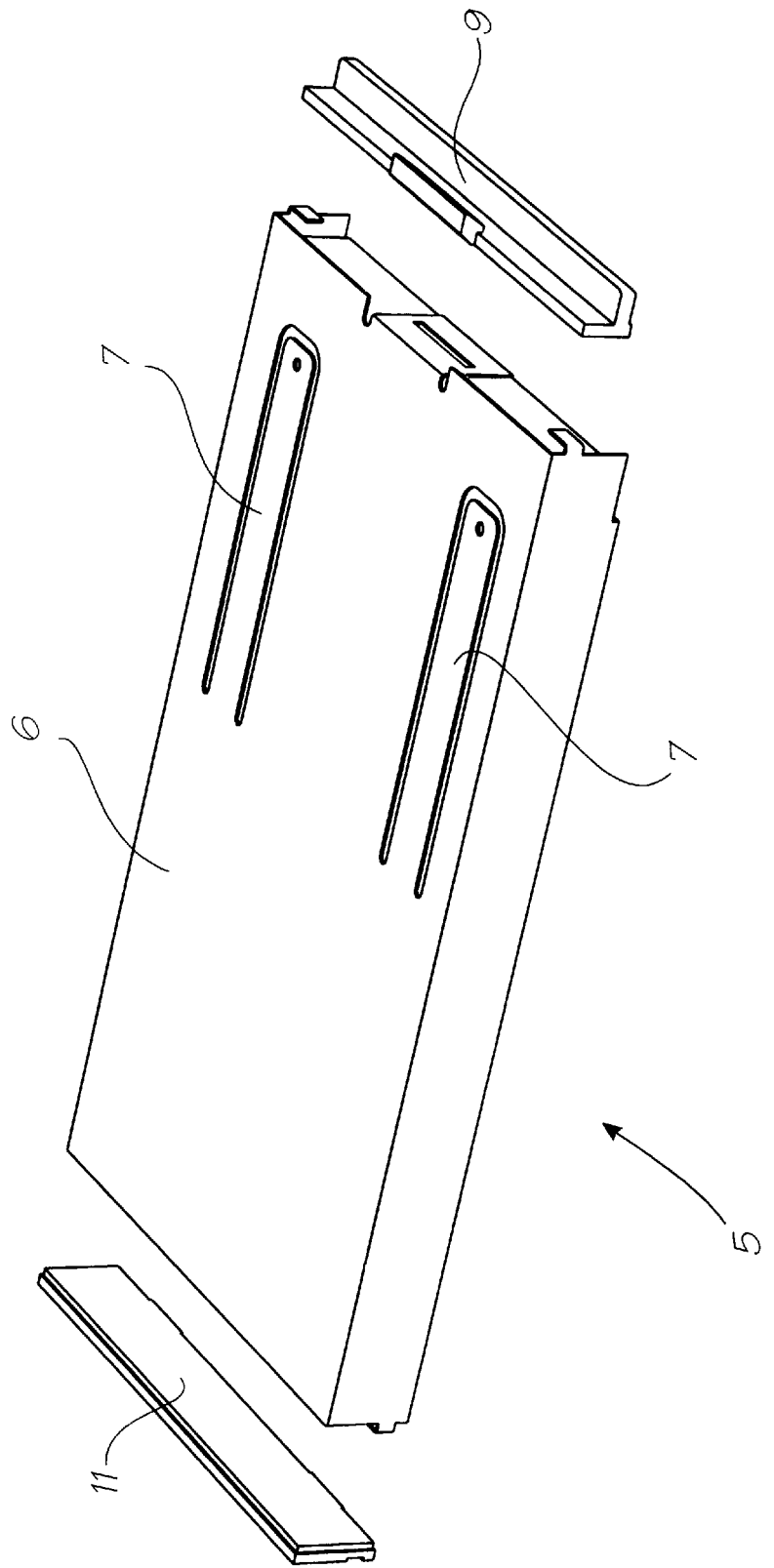
FIG. 2 is a perspective view of the paper cartridge shown in FIG. 1.
Figure 3:
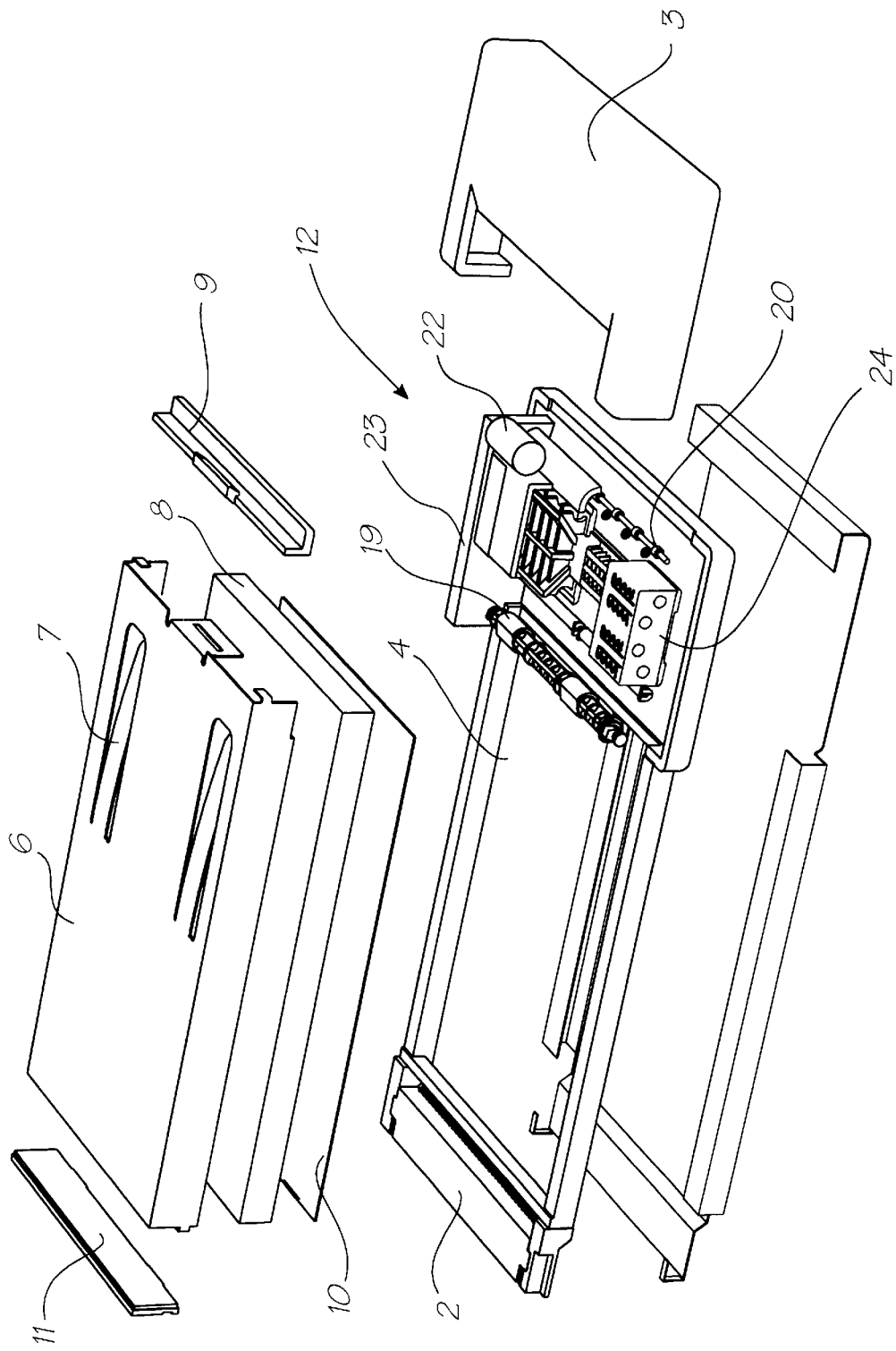
FIG. 3 is an exploded perspective view of the printer and cartridge shown in FIG. 1.
Figure 4:
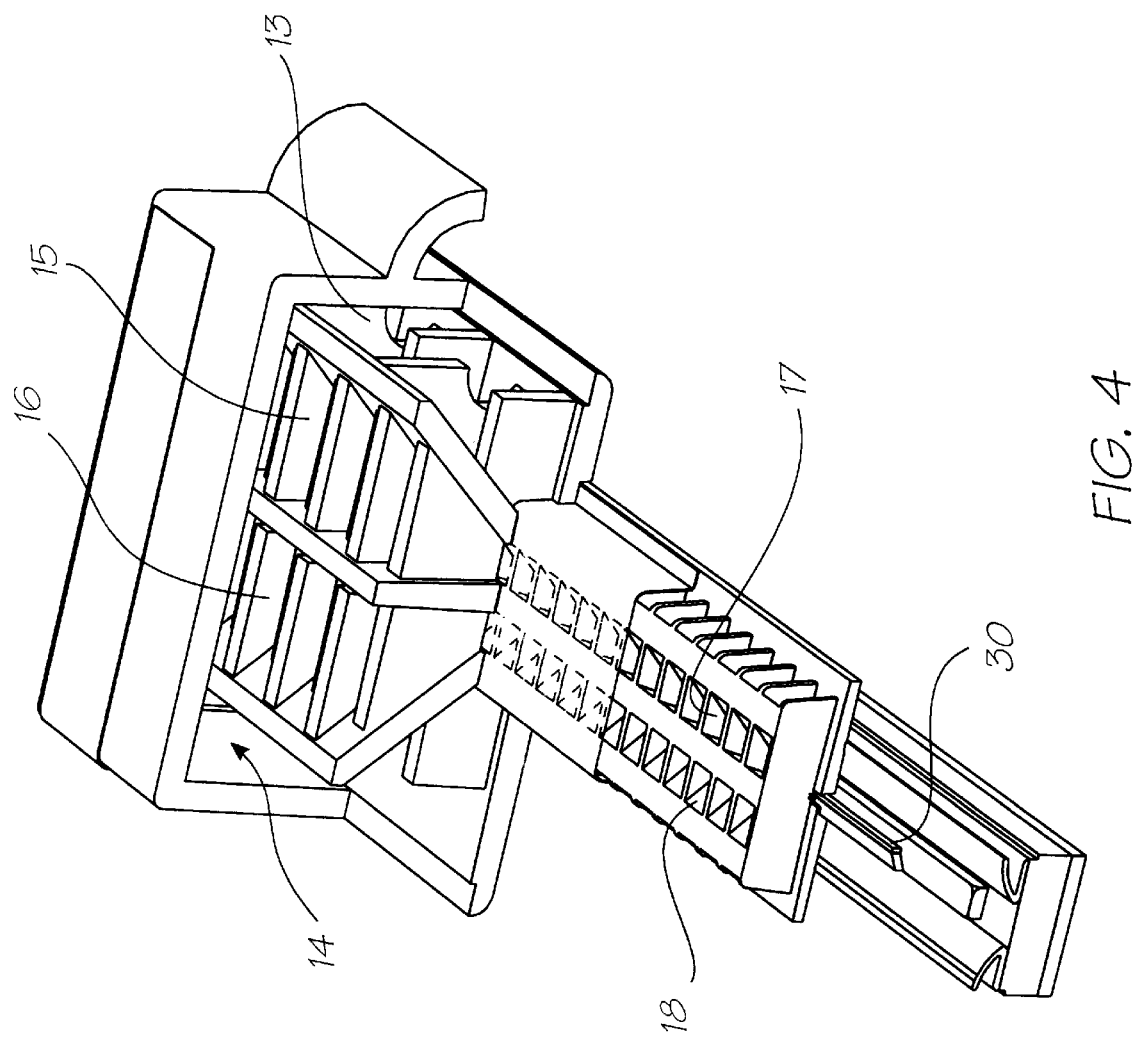
FIG. 4 is a perspective view to an enlarged scale of the printhead and ink reservoir shown in FIG. 3.

The printer incorporates a docking bay 4 adapted to receive a sheet paper cartridge shown in more detail in FIGS. 2 and 3.

The paper cartridge 5 typically has a metal cover 6 incorporating a pair of integral leaf springs 7 arranged to bear against the top of a paper stack 8, forcing the paper downwardly (in the sense shown in FIG. 3) to a lower position, where the lowermost sheet in the stack may be fed out beneath a front molding 9.

The cartridge is completed by a lower base member 10 and a back molding 11.

The pagewidth printer 12 located beneath cover 3 includes a series of ink channel reservoirs such as those shown at 13 and 14 with one reservoir for each ink color in addition to an additional reservoir of large capacity for black ink. The reservoirs are formed around a printhead having feed channels progressively reducing in size such as those shown at 15, 16, 17 and 18 feeding a printhead 30 formed by chip manufacturing techniques and incorporating CMOS and MEMS technology similar to that disclosed in Australian provisional patent application no. PP6534 filed on Oct. 16, 1998 entitled 'Micromechanical device and method (IJ46a)' assigned to the present applicant and incorporated herein by way of cross reference.

The printer unit 12 further includes rollers 19, 20 arranged to firstly withdraw the lowest sheet from the stack 8 in cartridge 5, forward the sheet across the printhead 30 on demand for printing and eject the sheet from the printer via exit slot 21. The rollers are driven from an electric motor 22 by way of a gear box 23.

The printer is controlled by a printer control chip interconnected between the PCMCIA interface 2 and the printer unit 12 and this may be incorporated within the printhead at 24 or in a flexible printed circuit board beneath the floor of docking bay 4.

The electronic circuitry to drive the printhead can also include an ASIC (application specific integrated circuit) device which provides for a one-time use of the printer unit 12 before it must be replaced. This circuit, in the form of an 'authentication chip' is preferably similar to that disclosed in international patent application PCT/AU98/00544, also assigned to the present applicant.

The provision of a detachable paper cartridge 5 as a separate item to the printer mechanism 12 allows for ready replenishment of paper supplies.

A portable printer of this type has many different applications including the printing of business cards on demand from an extremely compact and portable device which can be directly engaged with the PC card slot in a lap top or notebook type computer without the use of interconnecting cables or other devices. An enlarged version of the printer, also provided with a PCMCIA interface plug can be used to print larger materials in a similar manner, for example, the printing of 6 by 4 size photographs or other similar material It will be appreciated by a person skilled in the art that numerous variations and/or modifications may be made to the present invention as shown in the specific embodiment without departing from the spirit or scope of the invention as broadly described. The present embodiment is, therefore, to be considered in all respects to be illustrative and not restrictive.

What is claimed is:

1. A printer which includes a support case;
   a PC card interface plug positioned at one end of the support case and operatively engageable with a PC card slot of a computer-based machine;
   an ink jet printing unit positioned at an opposed end of the support case, the ink jet printing unit incorporating a printhead which, in turn, is formed using complementary metal oxide semiconductor (CMOS) and micro-electromechanical system (MEMS) technologies; and
   a docking bay for a sheet paper cartridge holder positioned intermediate the interface plug and the printing unit, and configured so that sheets of paper can be fed from a cartridge positioned in the docking bay, past the printhead.

2. A printer as claimed in claim 1, which includes a detachable sheet paper cartridge that is dimensioned so that a stack of generally business card sized sheets of paper can be stored in the cartridge, the cartridge being detachably received in the docking bay.

3. A printer as claimed in claim 2, which includes a number of rollers that are positioned to engage sheets of paper in the cartridge and to feed the sheets past the printhead.

4. A printer as claimed in claim 3, in which the cartridge includes a spring device that is positioned to urge the stack of sheets towards a position in which the sheets can be fed from the cartridge by the rollers.

5. A printer as claimed in claim 4, in which the cartridge includes a cover, the spring device being positioned so that, in use, the spring device serves to urge the stack of sheets away from the cover.

6. A printer as claimed in claim 1, in which the printing unit includes at least one ink reservoir in which ink to be fed to the printhead is stored.

7. A printer as claimed in claim 6, in which the printing unit includes a number of ink reservoirs, each corresponding to a respective ink of a particular color.

8. A printer as claimed in claim 1, which includes a printer control chip connected between the PC card interface and the printing unit to control operation of the printing unit.

9. A printer as claimed in claim 2, in which the support case and the printing unit are dimensioned to be approximately the size of a PCMCIA card.

10. A printer as claimed in claim 1, in which the PC card interface plug is a PCMCIA card interface plug.

* * * * *